United States Patent
Shimomura et al.

(10) Patent No.: US 7,352,173 B2
(45) Date of Patent: Apr. 1, 2008

(54) TURNING ANGLE DETECTOR

(75) Inventors: Osamu Shimomura, Nishio (JP); Tsutomu Nakamura, Kariya (JP); Kenji Takeda, Okazaki (JP); Yoshiyuki Kono, Obu (JP); Takashi Kawashima, Nagoya (JP); Takashi Hamaoka, Kariya (JP)

(73) Assignees: Nippon Soken, Inc. (JP); Denso Corporation (JP)

( * ) Notice: Subject to any disclaimer, the term of this patent is extended or adjusted under 35 U.S.C. 154(b) by 273 days.

(21) Appl. No.: 10/821,934

(22) Filed: Apr. 12, 2004

(65) Prior Publication Data

US 2004/0227506 A1 Nov. 18, 2004

(30) Foreign Application Priority Data

May 15, 2003 (JP) ............................. 2003-137517

(51) Int. Cl.
*G01B 7/14* (2006.01)
*G01B 7/30* (2006.01)

(52) U.S. Cl. ............................. 324/207.25; 324/207.2

(58) Field of Classification Search .......... 324/207.25, 324/207.2
See application file for complete search history.

(56) References Cited

U.S. PATENT DOCUMENTS

| 3,309,642 | A | 3/1967 | Grancoin |
| 3,368,127 | A | 2/1968 | Grancoin |
| 6,356,073 | B1 | 3/2002 | Hamaoka et al. |
| 6,476,600 | B2 | 11/2002 | Kono et al. |
| 6,693,424 | B2 * | 2/2004 | Makino et al. ........ 324/207.25 |
| 6,867,582 | B2 * | 3/2005 | Muraji et al. ............ 324/207.2 |
| 6,879,150 | B2 * | 4/2005 | Sekiya ................... 324/207.25 |
| 7,071,683 | B2 * | 7/2006 | Shimomura et al. ... 324/207.25 |
| 2002/0153879 | A1 | 10/2002 | Muraji et al. |

FOREIGN PATENT DOCUMENTS

| JP | 2001-4315 | 1/2001 |
| JP | 2001-208510 | 8/2001 |

* cited by examiner

*Primary Examiner*—Reena Aurora
(74) *Attorney, Agent, or Firm*—Nixon & Vanderhye PC

(57) ABSTRACT

External magnetic members are provided outside the outer periphery of a rotor. When the rotor is positioned around its turning angle of 70 degrees, part of the magnetic fluxes generated by magnets pass through the external magnetic members. This makes it possible to reduce the magnetic fluxes passing through Hall ICs around the turning angle of 70 degrees, thereby linearizing the change characteristic of the magnetic flux density. Thus, it is possible to generally linearize the change characteristic of the density of the magnetic fluxes through the Hall ICs 7, with the detectable angle range kept wide.

11 Claims, 9 Drawing Sheets

(0 deg)

(70 deg)

TURNING ANGLE DETECTOR

CROSS REFERENCE TO RELATED APPLICATION

This application is based on and incorporates herein by reference Japanese Patent Application No. 2003-137517 filed on May 15, 2003.

FIELD OF THE INVENTION

The present invention relates to a turning angle detector for detecting relative turning angles between two members, which may be a rotor and a stator.

BACKGROUND OF THE INVENTION

Various turning angle detectors are proposed. Some of the detectors are shown in FIGS. 14 and 15.

FIG. 14 schematically shows one of the turning angle detectors at a turning angle of 0 degree. This turning angle detector includes a rotor J3 and a stator J6. The rotor J3 includes two generally semi-cylindrical yokes J1 and two magnets J2. The rotor yokes J1 are made of magnetic material. Each end of each rotor yoke J1 is spaced with a magnet arrangement gap from one end of the other yoke J1. Each rotor magnet J2 is positioned in one of the magnet arrangement gaps between the rotor yokes J1. The poles of the two rotor magnets J2 are oriented in the same direction.

The stator J6 is surrounded by the rotor J1 and includes two cores J4 and two Hall ICs J5. The stator cores J4 are generally semi-columnar and made of magnetic material. The flat surfaces of the stator cores J4 define a magnetism detection gap between them. The Hall ICs J5 are positioned in the magnetism detection gap. Each Hall IC J5 is an IC including a Hall device incorporated into it, which is a magnetism sensing element.

FIG. 15 schematically shows another turning angle detector at a turning angle of 90 degrees. This turning angle detector includes a rotor J3 and a stator J6. The rotor J3 comprises two semi-cylindrical magnets J2 so that magnetic flux passes from one of the rotor magnets J2 to the other. The stator J6 is surrounded by the rotor J3 and includes two cores J4 and two Hall ICs J5. The stator cores J4 are generally semi-columnar and made of magnetic material. The axial flat surfaces of the stator cores J4 define a magnetism detection gap between them. The Hall ICs J5 are positioned in the magnetism detection gap.

FIG. 16A shows the relationship of typical turning angles to the density of the magnetic fluxes through the Hall ICs J5 (hereinafter referred to magnetic flux density) in each turning angle detector.

If the magnetic flux density changes in a sine curve with respect to the turning angles, the density change has a deviation characteristic, which is indicated by the broken line A in FIG. 16B, with respect to the ideal line (ideal magnetic flux density) that is the linearized density change. As indicated by the broken line A, the magnetic flux density drops greatly at turning angles of 60 and more degrees, so that the detectable angle range is narrow.

Therefore, the outside shape of the stator cores J4 and/or the inside shape of the rotor yokes J1 are varied so as to increase the magnetic flux density in the vicinity of the turning angle of 90 degrees, thereby widening the detectable angle range.

In FIG. 14, the rotor yokes J1 are generally elliptic so as to increase the magnetic flux density in the vicinity of the turning angle of 90 degrees, thereby widening the detectable angle range (for example, Patent Document 1).

In FIG. 15, the semi-cylindrical rotor magnets J6 are radially magnetized so as to increase the magnetic flux density in the vicinity of the turning angle of 90 degrees, thereby widening the detectable angle range (for example, Patent Documents 16 And 3).

[Patent Document1]
U.S. Pat. No. 6,476,600 (JP-A-2001-317909)
[Patent Document 2]
JP-A-2001-208510
[Patent Document 3]
U.S. Pat. No. 6,356,073 (JP-A-2001-188003)

In order to detect turning angles of the rotor J3 accurately from the magnetic flux density, it is necessary to linearize the change characteristic of the magnetic flux density in the detectable angle range.

As stated above, each of the turning angle detectors is so constructed that the magnetic flux density in the vicinity of the turning angle of 90 degrees is high for a wide range of detectable angles. As indicated by the solid line B in FIG. 16B, the change characteristic of the magnetic flux density in the devised detector has a deviation varying with respect to the ideal line and increasing remarkably around a turning angle of 70 degrees. Consequently, it is impossible to linearize the change characteristic in a wide range.

Therefore, the outside shape of the stator cores J4 and/or the inside shape of the rotor yokes J1 may be so varied as to linearize the deviation when the rotor J3 is positioned between its turning angles of about 70 and 80 degrees. In this case, as shown in FIG. 16C, the characteristic line (ultimate line) drops sharply at turning angles of 80 and more degrees, so that the detectable angle range is narrow.

SUMMARY OF THE INVENTION

The object of the present invention is to maintain a low magnetic flux density in a predetermined range of turning angles by a magnetic flux reducing means. The invention can be applied to raise the linearity of magnetic flux density with respect to turning angles in a turning angle detector that can detect a wide range of angles.

According to one aspect of the present invention, a turning angle detector includes an external magnetic member, through which part of the magnetic flux generated by a magnet passes within a predetermined range of turning angles, so that the great deviation in this range can be suppressed.

According to another aspect of the present invention, a turning angle detector has a magnetic shortcut, which is provided between cores and adjacent to a magnetic force generating device. A large magnetic flux passes through the magnetic shortcut in the predetermined range of turning angles, so that the great deviation in this range can be suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described below in further detail with reference to various embodiments shown in the accompanying drawings.

First Embodiment

Figure 1:
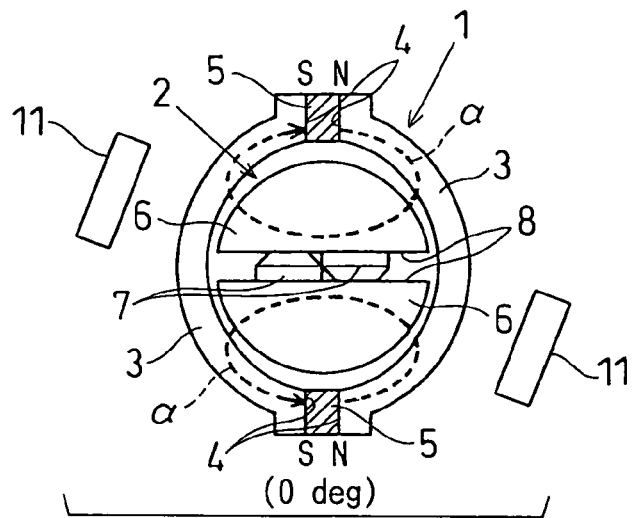
FIG. 1 is an end view of a turning angle detector (first embodiment).

Referring first to FIG. 1, a turning angle detector is shown at turning angle of 0 degree. The turning angle detector, which may detect the opening of a throttle valve, includes a generally tubular rotor 1 and a stator 2. The rotor 1 is fixed to the shaft of the throttle valve so as to turn with it around the stator 2.

The rotor 1 coaxially surrounds the stator 2 and is spaced from it in the radial direction. The rotor 1 comprises two generally semi-cylindrical yokes 3 and two permanent magnets 5, and operates to generate a magnetic force. The rotor yokes 3 are made of iron or other magnetic material. Each circumferential end of each rotor yoke 3 is spaced with a magnet arrangement gap 4 from one circumferential end of the other yoke. Each rotor magnet 5 is positioned in one of the magnet arrangement gaps 4 between the rotor yokes 3. The poles of the two rotor magnets 5 are oriented in the same direction. One of the rotor yokes 3 has a north pole, and the other yoke has a south pole.

The stator 2 comprises two cores 6 and two Hall ICs 7. The stator cores 6 are surrounded coaxially by the rotor 1. The Hall ICs 7 detect the density of the magnetic fluxes through the stator cores 6.

The stator cores 6 are generally semi-columnar or polygonal and made of iron or other magnetic material. The flat surfaces of the stator cores 6 facing each other define a magnetism detection gap 8 between them. The Hall ICs 7 are fixedly positioned in the magnetism detection gap 8.

Each Hall IC 7 is an IC including a Hall device, which is a magnetism sensing element, and a signal amplifying circuit. The Hall ICs 7 output voltage signals according to the magnetic flux density passing through them.

The basic operation of the turning angle detector as described above (without external magnetic members 11 mounted, which will be described later on) will be described on the assumption that, the rotor 1 is defined as being positioned at turning angle of 0 degree when the magnet arrangement gaps 4 are aligned perpendicular to the magnetism detection gap 8 as shown in FIG. 1.

When the rotor 1 has turns counterclockwise (in the plus direction) from its turning angle of 0 degree to its turning angle of 90 degrees, the magnet arrangement gaps 4 are aligned with the magnetism detection gap 8. When the rotor 1 is positioned at this turning angle of 90 degrees, magnetic circuits are formed in which magnetic fluxes pass from the north poles of the rotor magnets 5 through one rotor yoke 3, one stator core 6, the gap 8, the other stator core 6 and the other yoke 3 in that order to the south poles of the magnets 5.

When the rotor 1 turns further with the throttle valve from the foregoing position (90 degrees), the magnetic fluxes passing through only one of the stator cores 6 increase. As a result, the fluxes passing through the magnetism detection gap 8 decrease.

Figure 16A:
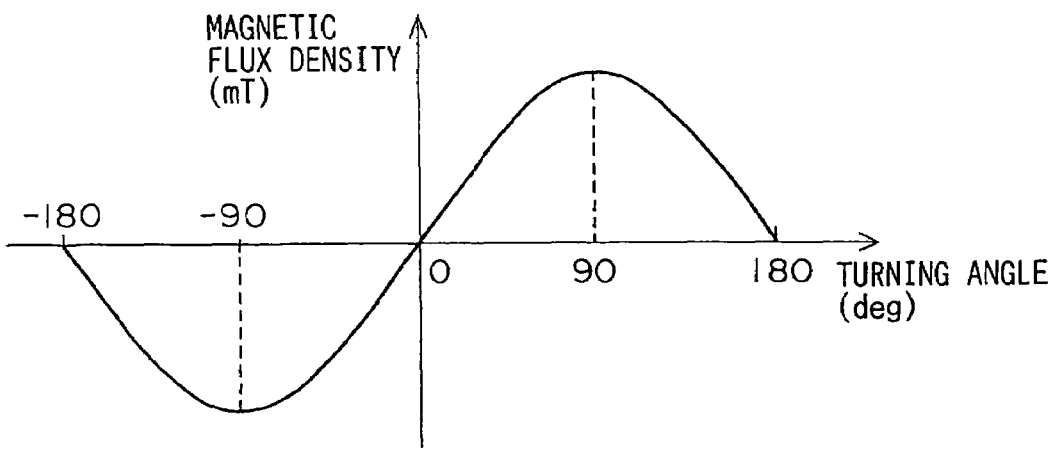
FIGS. 16A to 16C are charts showing the relationship between magnetic flux density and turning angles of the conventional turning angle detectors.

When the rotor 1 is positioned at its turning angle of 90 degrees, the density of the magnetic fluxes through the Hall ICs 7 is at its maximum as shown in FIG. 16A. When the rotor 1 is positioned at its turning angle larger or smaller than 90 degrees, the magnetic flux quantity through the magnetism detection gap 8 is less according to the turning angle, so that the density of the magnetic fluxes through the Hall ICs 7 is less.

When the rotor 1 is positioned at its turning angle of 0 degree, as shown in FIG. 1, each magnetic flux passes through only one stator core 6 and does not pass from one stator core 6 to the other. This makes no magnetic flux pass through the magnetism detection gap 8, so that the density of the magnetic fluxes through the Hall ICs 7 is zero.

As the rotor 1 turns clockwise (in the minus direction) from its turning angle of 0 degree, the magnetic fluxes in the opposite direction through the magnetism detection gap 8 increase in quantity according to the turning angle. When the rotor 1 is positioned at its turning angle of −90 degrees, the magnetic fluxes in the opposite direction through the Hall ICs 7 are highest in density.

As the rotor 1 turns clockwise further from its turning angle of −90 degrees, the magnetic fluxes in the opposite direction through the magnetism detection gap 8 decrease in quantity according to the turning angle, so that the magnetic fluxes in the opposite direction through the Hall ICs 7 decrease in density.

Figure 16B:
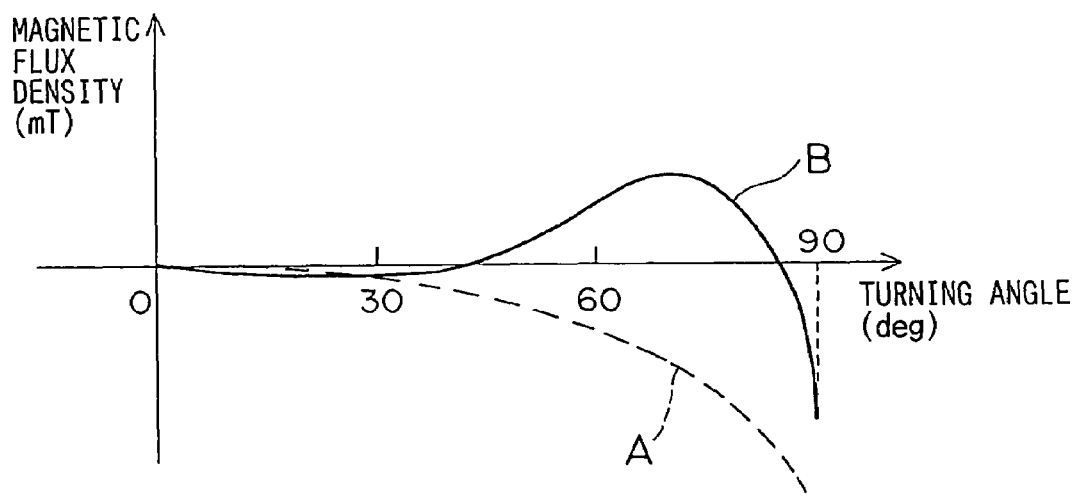

If the density of the magnetic fluxes through the Hall ICs 7 changes in a sine curve with respect to the turning angles, as described in the description of the conventional art, the density change has a deviation characteristic, which is indicated by the broken line A in FIG. 16B, with respect to the ideal line that is the linearized density change. As indicated by the line A, the magnetic flux density drops greatly at turning angles of 60 and more degrees, so that the detectable angle range is narrow.

Therefore, it is proposed in the conventional art to vary the outside shape of the stator cores 6 and/or the inside shape of the rotor yokes 3 so as to increase the magnetic flux density in the vicinity of the turning angle of 90 degrees, thereby widening the detectable angle range.

In this embodiment, the shape of the rotor yokes 3 is so shaped as to increase the magnetic flux density in the vicinity of the turning angle of 90 degrees, thereby widening the detectable angle range of the rotor 1. Specifically, as shown in FIG. 1, the rotor yokes 3 are generally elliptic so that their middle is nearest to the stator cores 6. This increases the magnetic flux density in the vicinity of the turning angle of 90 degrees, so that the detectable angle range can be wider.

In order to detect turning angles of the rotor 1 accurately from the density of the magnetic fluxes through the Hall ICs 7, it is necessary to linearize the change characteristic of the magnetic flux density in the detectable angle range.

As stated above, the change characteristic of the density of the magnetic fluxes through the Hall ICs 7 of the turning angle detector devised for a wider range of detectable angles increases the magnetic flux density in the vicinity of the turning angle of 90 degrees. Consequently, as indicated by the solid line B in FIG. 16B, the change characteristic has a deviation varying with respect to the ideal line and increasing suddenly around a turning angle of 70 degrees. Consequently, it is impossible to linearize the change characteristic in a wide range.

Figure 16C:
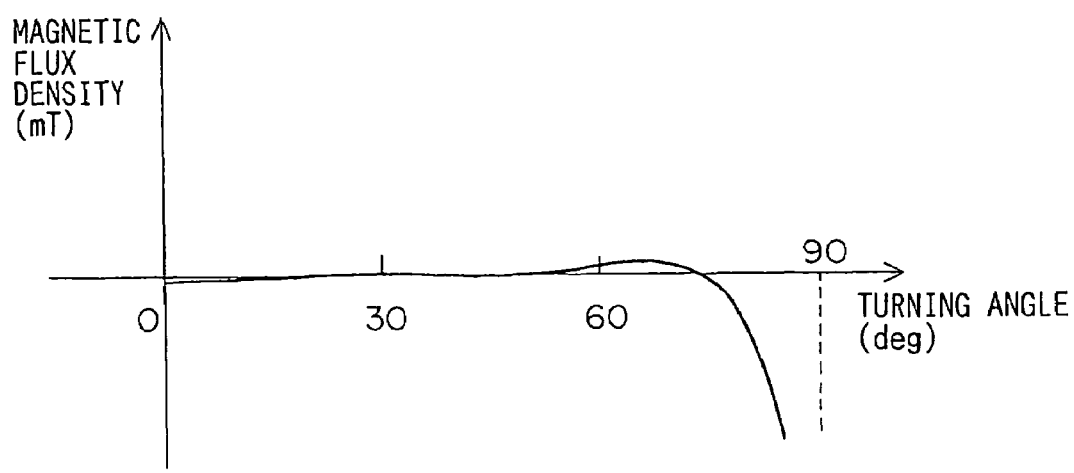

The outside shape of the stator cores 6 and/or the inside shape of the rotor yokes 3 might be so varied as to linearize the deviation between turning angles of about 70 and about 80 degrees. In this case, as shown in FIG. 16C, the (ultimate) characteristic line drops suddenly at turning angles of 80 and more degrees, so that the detectable angle range is narrow.

According to the first embodiment, therefore, the change characteristic of the density of the magnetic fluxes through the Hall ICs 7 is linearized, with the turning angle range kept wide, by reducing the magnetic fluxes α in an angle range where the fluxes are large with respect to the ideal line.

Figure 2A:
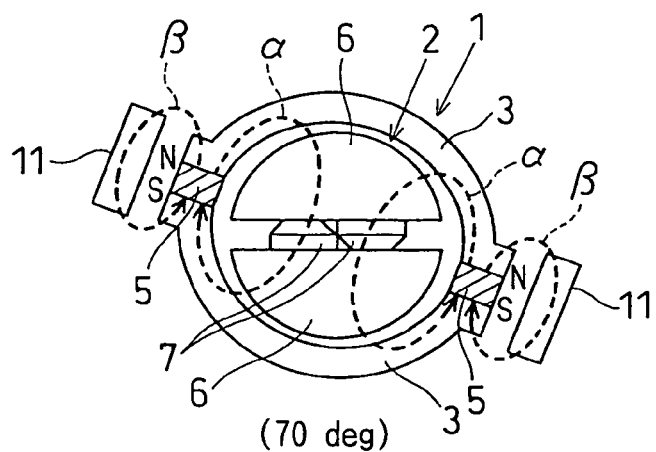
FIGS. 2A and 2B are an end view of the turning angle detector and a chart showing the relationship between magnetic flux density and turning angles (first embodiment).

The turning angle detector therefore further includes external magnetic members 11, which may be rectangular solids of iron, as shown in FIG. 1. When the rotor 1 is positioned at its predetermined turning angle, part of the fluxes generated by the rotor magnets 5 pass through the external magnetic members 11 as shown in FIG. 2A in place of passing through the stator cores 6. The external magnetic members 11 are positioned outside and spaced from the rotor 1. The external magnetic members 11 are fitted to fixed members, which may be fixed to the throttle valve case.

The predetermined turning angle is the turning angle of the rotor 1 at which the magnetic fluxes are large with respect to the ideal line. The predetermined turning angle is about 70 degrees.

Because the Hall ICs 7 are two in number, the external magnetic members 11 are two in number and each associated with one of the two rotor magnets 5. Alternatively, the turning angle detector might include a single Hall IC 7 positioned on its axis and a single external magnetic member 11, which could reduce the magnetic fluxes through the Hall IC 7 at the predetermined turning angle (for example, about 70 degrees).

The external magnetic members 11 reduce the magnetic fluxes in the angle range where the fluxes are large with respect to the ideal line. This makes it possible to linearize the change characteristic of the density of the magnetic fluxes through the Hall ICs 7, with the turning angle range kept wide.

The turning angle detector operates specifically as follows.

When the rotor 1 is positioned between its turning angles of about 0 and about 40 degrees, the rotor magnets 5 generate only primary (main) magnetic fluxes α, as shown in FIG. 1. These magnetic fluxes α pass first through one rotor yoke 3, then each through one stator core 6 and finally through the other yoke 3 and return to the rotor magnets 5.

Figure 2B:
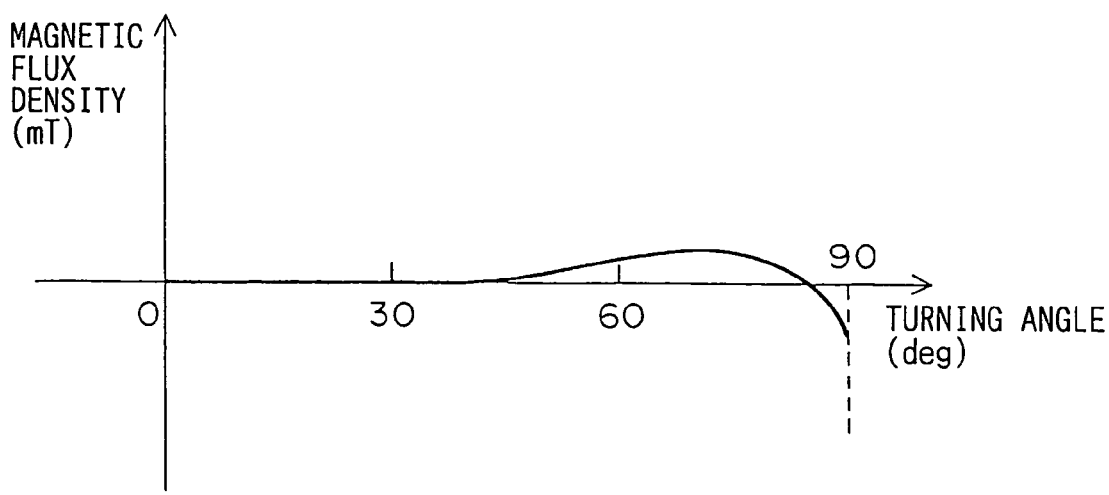

When the rotor 1 is positioned between its turning angles of about 40 and about 80 degrees, particularly at about 70 degrees, as shown in FIG. 2A, the rotor magnets 5 are near to the external magnetic members 11 and generate primary magnetic fluxes α and secondary magnetic fluxes β. The primary magnetic fluxes α pass through one rotor yoke 3, one stator core 6, the other core 6 and the other yoke 3 in that order, and return to the rotor magnets 5. The secondary magnetic fluxes β pass through the external magnetic members 11. The generation of the secondary magnetic fluxes β reduces the primary magnetic fluxes α, which include a surplus with respect to the ideal line. Consequently, as shown in FIG. 2B, the changes in the primary magnetic fluxes α approach the ideal line.

When the rotor 1 is positioned at its turning angles of about 80 and more degrees, the rotor magnets 5 are away from the external magnetic members 11 again, so that the magnets 5 generate only primary magnetic fluxes α. These magnetic fluxes α pass first through one rotor yoke 3, then each through one stator core 6 and finally through the other yoke 2 and return to the rotor magnets 5. Thus, when the rotor 1 is positioned at its turning angles of about 80 and more degrees, the rotor magnets 5 generate no secondary magnetic fluxes β, which would reduce the primary magnetic fluxes α. This prevents the detectable angle range from becoming narrow as opposed to the conventional case (FIG. 16B).

Thus, the magnetic flux density in the vicinity of the turning angle of 90 degrees is increased so that the detectable angle range of the rotor 1 can be made wide. Besides, the external magnetic members 11 are so fitted to the fixed members that the magnetic fluxes in the angle range where the fluxes are large with respect to the ideal line can pass through the magnetic materials 11. This makes it possible to generally linearize the change characteristic of the density of the magnetic fluxes through the Hall ICs 7, with the detectable angle range kept wide between 0 and 90 degrees.

This makes it possible to accurately detect a wide range of turning angles of the throttle valve.

Second Embodiment

Figure 3A:
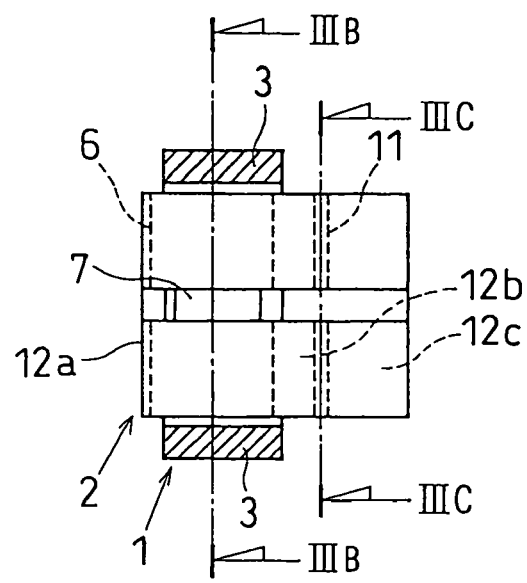
FIGS. 3A to 3C are an axial sectional view of a turning angle detector (second embodiment), and cross sectional views taken along lines IIIA-IIIA and IIIB-IIIB, respectively.
Figure 3B:
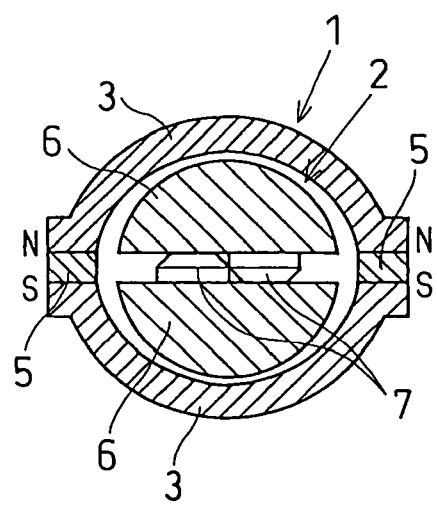
Figure 3C:
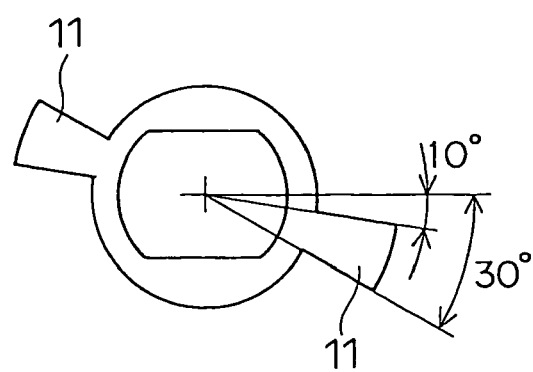

The turning angle detector is shown in FIGS. 3A to 3C with its rotor 1 being positioned at its turning angle of 90 degrees as understood from FIG. 3B. The external magnetic members 11 are positioned inside the rotor 1, but axially away from it.

The external magnetic members 11 are a plate of iron or other magnetic material, which is shaped as shown in FIG. 3C and positioned coaxially with the stator cores 6. This embodiment can achieve effects similar to those achieved by the first embodiment.

With reference to FIG. 3A, the turning angle detector includes non-magnetic materials 12*a*, 12*b* and 12*c*, which may be resinous. The non-magnetic material 12*b* is interposed between the stator cores 6 and the external magnetic member 11. Alternatively, the external magnetic members 11 might be positioned on end faces of the stator cores 6.

Third Embodiment

Figure 4:
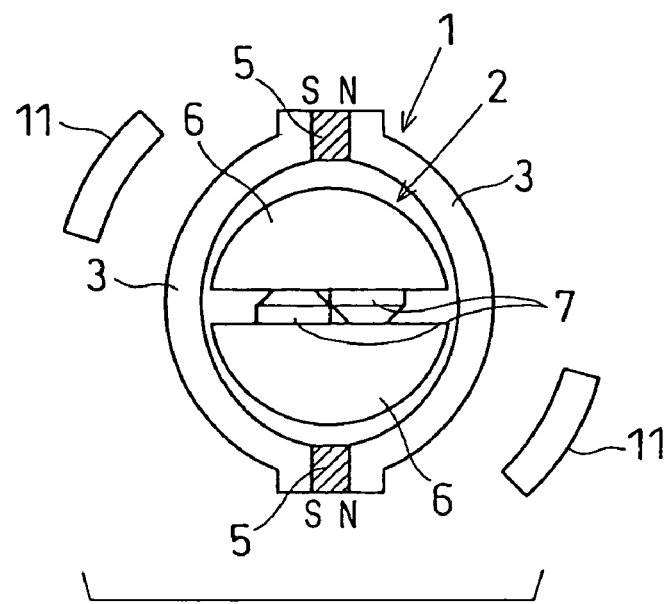
FIG. 4 is an end view of a turning angle detector (third embodiment).

The turning angle detector is shown in FIG. 4 with its rotor 1 being positioned at its turning angle of 0 degree. In this third embodiment, the external magnetic members 11 are arcuate. This embodiment can achieve effects similar to those achieved by the first embodiment.

Fourth Embodiment

Figure 5:
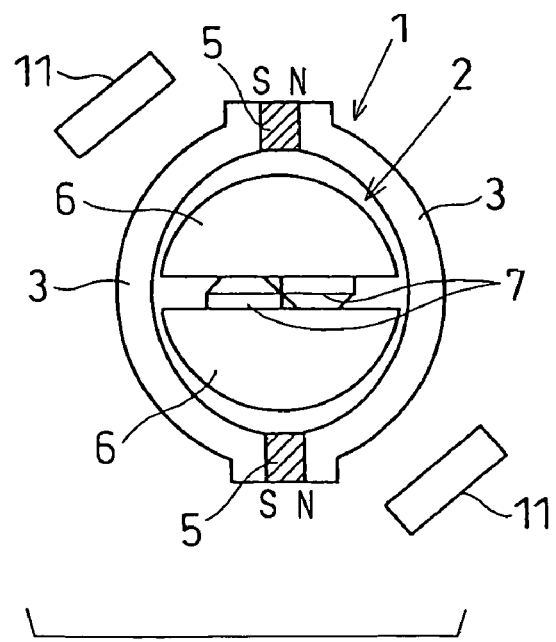
FIG. 5 is an end view of a turning angle detector (fourth embodiment).

The turning angle detector is shown in FIG. 5 as being positioned at its turning angle of 0 degree.

In the first embodiment, when the rotor 1 is positioned near its turning angle of 70 degrees, the rotor magnets 5 are nearest to the external magnetic members 11. However, for example, the angle range where the magnetic fluxes become large with respect to the ideal line may be in the vicinity of 30 degrees. In this case, the external magnetic members 11 are positioned at the turning angle of 30 degrees as shown in FIG. 5. As a result, when the rotor 1 is positioned near its turning angle of 30 degrees, the rotor magnets 5 are nearest to the external magnetic members 11.

Fifth Embodiment

Figure 6:
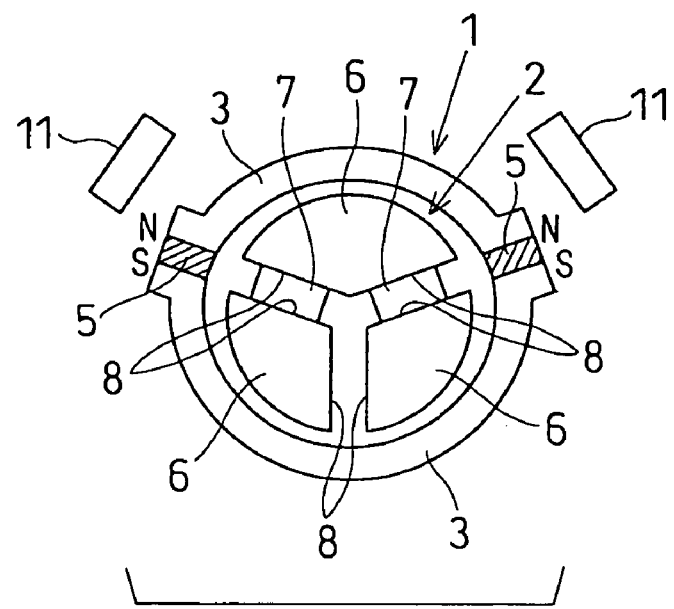
FIG. 6 is an end view of a turning angle detector (fifth embodiment).

The turning angle detector is shown in FIG. 6, with its rotor 1 being positioned at its turning angle of 90 degrees. In this fifth embodiment, the stator 2 includes three cores 6, which define three magnetism detection gaps 8 each between two of them.

One Hall IC 7 is positioned in one magnetism detection gap 8. Another Hall IC 7 is positioned in another magnetism detection gap 8. Even in the thus constructed detector, as is the case with the first embodiment, when the rotor 1 is positioned in a predetermined turning angle range, for example, around 70 degrees, the magnetic fluxes are large with respect to the ideal line. Accordingly, the external magnetic members 11 are so positioned as to be nearest to the rotor magnets 5 when the rotor 1 is positioned at the predetermined turning angle, which may be about 70 degrees.

The external magnetic members 11 enable even the turning angle detector including three stator cores 6 to achieve effects similar to those achieved in the first embodiment.

Sixth Embodiment

Figure 7:
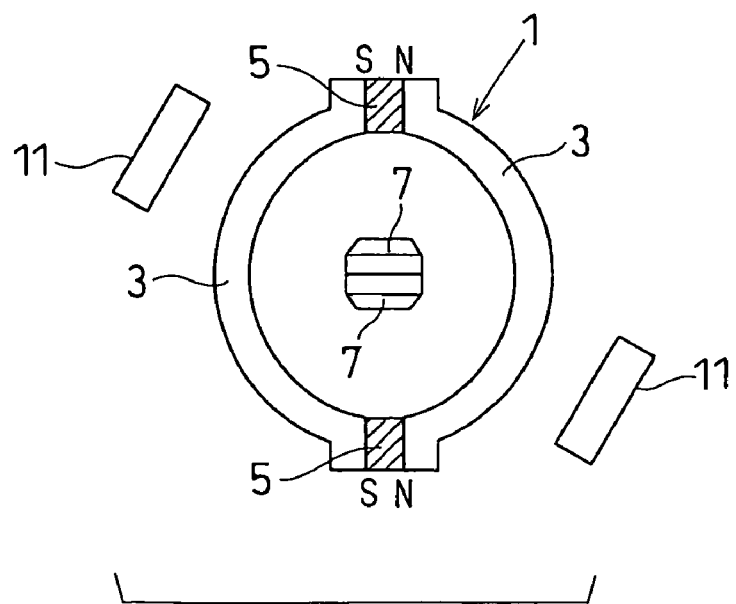
FIG. 7 is an end view of a turning angle detector (sixth embodiment).

The turning angle detector is shown in FIG. 7, with the rotor 1 being positioned at its turning angle of 0 degree. In this sixth embodiment, the turning angle detector includes no stator core 6. The external magnetic members 11 enable even the turning angle detector including no stator core 6 to achieve effects similar to those achieved in the first embodiment.

Seventh Embodiment

Figure 8:
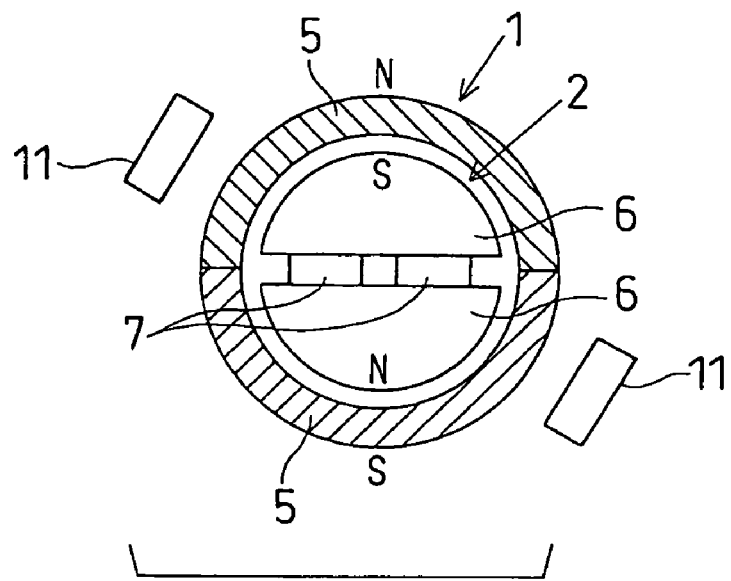
FIG. 8 is an end view of a turning angle detector (seventh embodiment).

The turning angle detector is shown in FIG. 8, with the rotor 1 being positioned at its turning angle of 90 degrees. In each of the first through sixth embodiments, the rotor yokes 3 are generally elliptic so as to increase the magnetic flux density in the vicinity of the turning angle of 90 degrees, thereby widening the detectable angle range of the rotor 1. In this seventh embodiment, the rotor 1 is generally cylindrical and includes no yoke 3, but comprises two semicylindrical magnets 5.

These rotor magnets 5 are so magnetized that magnetic fluxes pass from one of them through the stator 2 to the other. The rotor magnets 5 are radially magnetized so that the magnetic flux density in the vicinity of the turning angle of 90 degrees can be higher for a wider range of detectable angles of the rotor 1.

The external magnetic members 11 enable even the turning angle detector including radially magnetized rotor magnets 5 to achieve effects similar to those achieved in the first embodiment.

Eighth Embodiment

Figure 9:
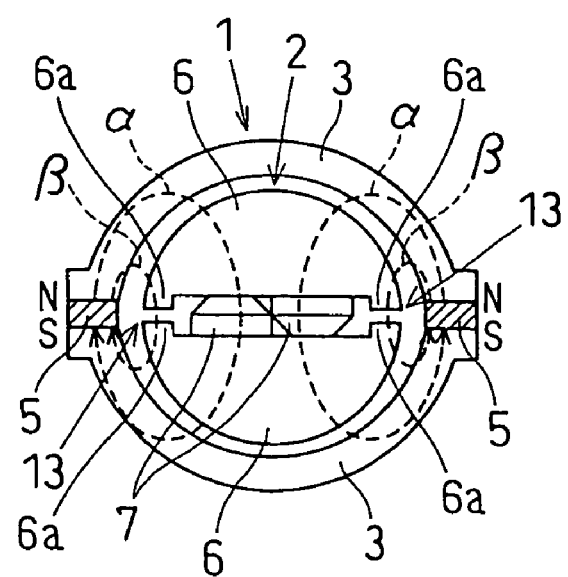
FIG. 9 is an end view of a turning angle detector (eighth embodiment).

The turning angle detector is shown in FIG. 9, with the rotor 1 being positioned at its turning angle of 90 degrees. In this eighth embodiment, the stator cores 6 have magnetic shortcuts 13 formed radially outside the Hall ICs 7 and adjacent to the rotor 1. The magnetic shortcuts 13 are formed by protrusions 6a extending from each flat surface of the stator core 6 to face each other at the circumferential ends of the stator cores 6. Each protrusion 6a is shaped generally in a rectangular form in cross section. The shortcuts 13 are thus narrower than the radial thickness of the Hall ICs 7 and cause secondary magnetic fluxes β to be formed, which bypass the ICs 7. As shown in FIG. 9, primary magnetic fluxes α and secondary magnetic fluxes β are formed, which pass through the Hall ICs 7 and the magnetic shortcuts 13, respectively.

The provision of the magnetic shortcuts 13 makes a large part of the magnetic fluxes pass through them in the angle range where the fluxes are large with respect to the ideal line. Specifically, at the predetermined turning angle, which may be about 70 degrees, the primary magnetic fluxes α decrease, and large secondary magnetic fluxes β pass. Thus, the magnetic shortcuts 13 operate to reduce the magnetic fluxes passing through the Hall ICs 7 at the predetermined turning angle. This makes it possible to linearize the change characteristic of the density of the magnetic fluxes through the Hall ICs 7, with the turning angle range kept wide.

Ninth Embodiment

Figure 10:
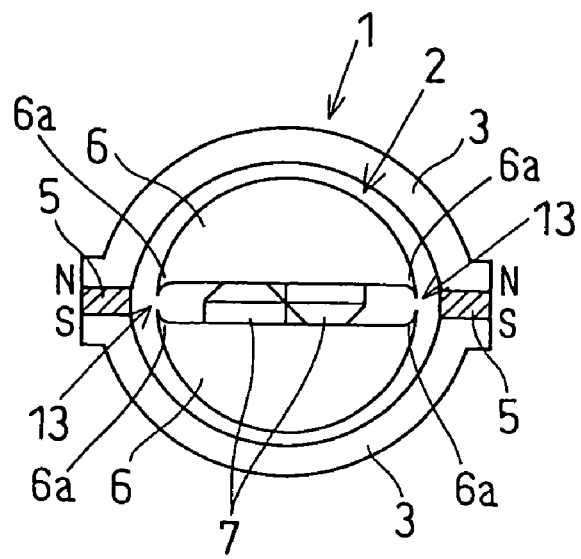
FIG. 10 is an end view of a turning angle detector (ninth embodiment).

The turning angle detector is shown in FIG. 10, with the rotor 1 being positioned at its turning angle of 90 degrees. In this ninth embodiment, the magnetic shortcuts 13 have sharp arcuate ends with the protrusions 6a being shaped in a sharp, pointed form in cross section. This turning angle detector can achieve effects similar to those achieved in the eighth embodiment.

Tenth Embodiment

Figure 11:
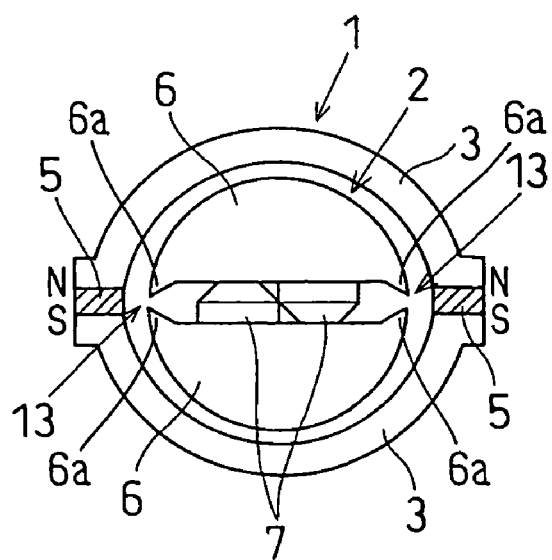
FIG. 11 is an end view of a turning angle detector (tenth embodiment).

The turning angle detector is shown in FIG. 11, with the rotor 1 being positioned at its turning angle of 90 degrees. In this tenth embodiment, the inner sides of the magnetic shortcuts 13 are flat with the protrusions 6a shaped in a triangular form in cross section. This turning angle detector can achieve effects similar to those achieved in the eighth embodiment.

Eleventh Embodiment

Figure 12:
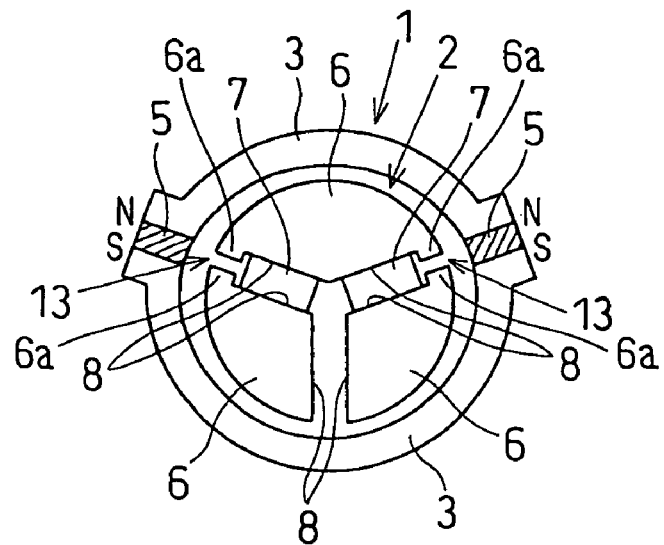
FIG. 12 is an end view of a turning angle detector (eleventh embodiment).

The turning angle detector is shown in FIG. 12, with the rotor 1 being positioned at its turning angle of 90 degrees. In this eleventh embodiment, as is the case with the fifth embodiment, the stator 2 includes three cores 6, which define three magnetism detection gaps 8 each between two of them. One Hall IC 7 is positioned in one gap 8 for magnetism detection. Another Hall IC 7 is positioned in another gap 8 for magnetism detection.

As is the case with the eighth embodiment, the stator cores 6 have magnetic shortcuts 13 formed by the protrusions 6a radially outside the Hall ICs 7 and adjacent to the rotor 1. This makes large secondary magnetic fluxes β pass in the angle range where the magnetic fluxes are large with respect to the ideal line. Consequently, it is possible to linearize the change characteristic of the density of the magnetic fluxes through the Hall ICs 7, with the turning angle range kept wide.

Twelfth Embodiment

Figure 13:
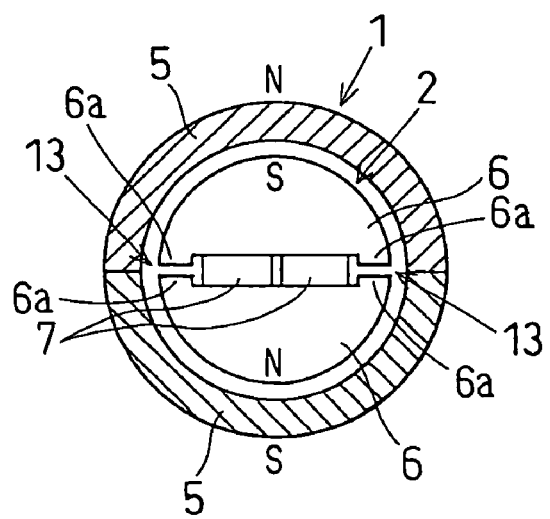
FIG. 13 is an end view of a turning angle detector (twelfth embodiment).
Figure 14:
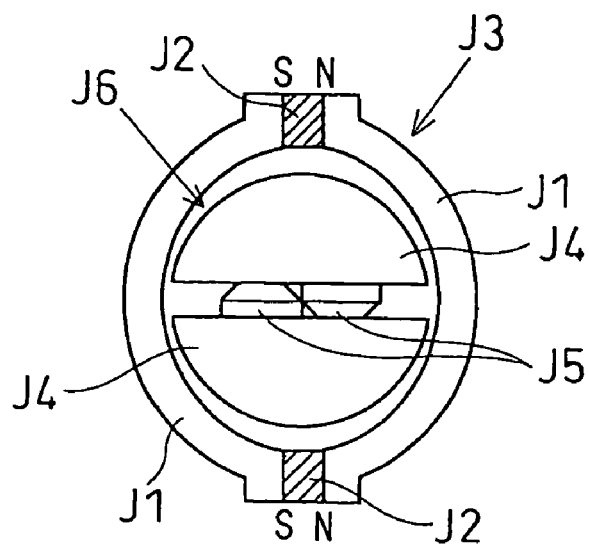
FIG. 14 is an end view of a conventional turning angle detector.
Figure 15:
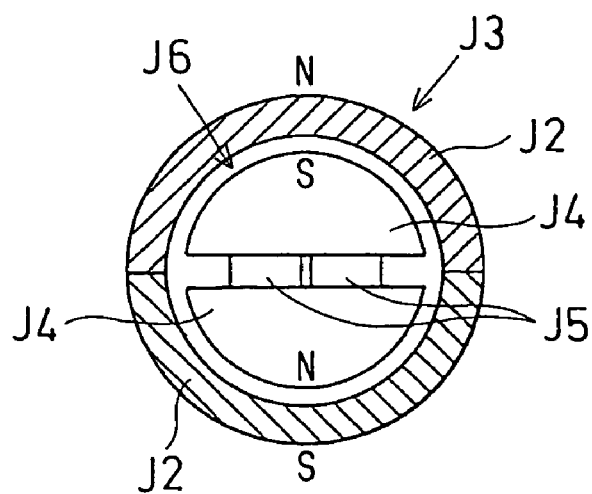
FIG. 15 is an end view of another conventional turning angle detector.

The turning angle detector is shown in FIG. 13, with the rotor 1 being positioned at its turning angle of 90 degrees. In this embodiment, as is the case with the seventh embodiment, the rotor 1 is generally cylindrical and includes no yoke 3 but comprises two semi-cylindrical magnets 5, which are radially magnetized.

As is the case with the eighth embodiment, the stator cores 6 have magnetic shortcuts 13 formed by the protrusions 6a radially outside the Hall ICs 7 and adjacent to the rotor 1. The magnetic shortcuts 13 make large secondary magnetic fluxes β pass in the angle range where the magnetic fluxes are large with respect to the ideal line. This makes it possible to linearize the change characteristic of the density of the magnetic fluxes through the Hall ICs 7, with the turning angle range kept wide, even though the rotor 1 comprises two radially magnetized magnets 5.

Modifications

In each of the embodiments, the stator 2 is fixed, and the rotor 1 is rotatable. Alternatively, the turning angle detector may include a fixed cylindrical member in place of the rotor 1 and a rotatable columnar member in place of the stator 2. That is, a magnetism sensing element corresponding to the Hall ICs 7 may be rotatable, and a magnetic force generating means corresponding to the rotor magnets 5 may be fixed. In this case, also, the turning angles of the columnar member can be detected from the output from the magnetism sensing element.

In each of the embodiments, the Hall ICs 7 as magnetism sensing elements are two in number, but may be one or more than two. Only a magnetism sensing element (for example, Hall ICs 7) may be positioned in the magnetism detection gap 8, and a signal amplifying circuit may be positioned outside the stator 2. For example, the amplifying circuit may be provided in a controller.

In the embodiments, the rotor magnets 5 are permanent magnets, but may alternatively be electromagnets.

The turning angle detector according to each of the embodiments is exemplified by a detector for detecting the opening of a throttle valve, but may alternatively detect turning angles of any other turning body such as an industrial robot arm.

What is claimed is:

1. A turning angle detector comprising:
a magnetic flux generating means including a magnet for generating magnetic fluxes;
a magnetism sensing element responsive to the magnetic fluxes passing therethrough to detect a relative turning angle between the magnetic flux generating means and the magnetism sensing element from the magnetic fluxes passing therethrough; and
a magnetic flux reducing means for passing therethrough only a part of the magnetic fluxes generated by the magnet thereby to reduce the magnetic fluxes passing through the magnetism sensing element only when the relative turning angle between the magnetic flux generating means and the magnetism sensing element is within a predetermined range of turning angles, which predetermined range is less than a full range of relative turning angles,
wherein at least one of said magnetic flux reducing means and said magnetic flux generating means is rotatable relative to the other of said magnetic flux reducing means and said magnetic flux generating means,
wherein the magnetic flux reducing means includes an external magnetic member made of magnetic material to pass the part of the magnetic fluxes therethrough, and
wherein the magnetic flux generating means includes a magnetic flux passage means, provided separately from the magnetic flux reducing means, for forming a magnetic path different from that of the magnetic flux reducing means.

2. The turning angle detector as in claim 1, wherein:
the magnetic flux generating means includes two generally semi-cylindrical yokes made of magnetic material and sandwiching the magnet between respective circumferential ends; and
the yokes have an inside shape of an ellipse.

3. The turning angle detector as in claim 1, wherein:
the magnet is divided into two generally semi-cylindrical magnet parts and magnetized in a radial direction; and
the magnetism sensing element is disposed between the magnet parts so that the magnetic fluxes pass from one of the magnet parts to the other of the magnet parts through the magnetism sensing element.

4. The turning angle detector as in claim 1, wherein the external magnetic member is provided radially outside the magnetic flux generating means.

5. The turning angle detector as in claim 1, wherein the external magnetic member is provided radially inside the magnetic flux generating means and axially displaced from the magnetism sensing element.

6. A turning angle detector comprising:
a magnetic flux generating means including a magnet for generating magnetic fluxes;
a magnetism sensing element responsive to the magnetic fluxes passing therethrough to detect a relative turning angle between the magnetic flux generating means and the magnetism sensing element from the magnetic fluxes passing therethrough; and
a magnetic flux reducing means for passing therethrough only a part of the magnetic fluxes generated by the magnet thereby to reduce the magnetic fluxes passing through the magnetism sensing element only when the relative turning angle between the magnetic flux generating means and the magnetism sensing element is within a predetermined range of turning angles, which predetermined range is less than a full range of relative turning angles,
wherein the magnetic flux reducing means includes an external magnetic member made of magnetic material to pass the part of the magnetic fluxes therethrough,
wherein the magnetic flux generating means includes two generally semi-cylindrical yokes made of magnetic material and sandwiching the magnet between respective circumferential ends; and
wherein the yokes have an inside shape of an ellipse.

7. The turning angle detector as in claim 6, wherein said yokes are provided separately from the magnetic flux reducing means and form a magnetic path different from that of the magnetic flux reducing means.

8. A turning angle detector comprising:
a magnetic flux generator including a magnet for generating magnetic fluxes;
a magnetism sensing element responsive to the magnetic fluxes passing therethrough to detect a relative turning angle between the magnetic flux generator and the magnetism sensing element from the magnetic fluxes passing therethrough; and
a magnetic flux reducer for passing therethrough only a part of the magnetic fluxes generated by the magnet thereby to reduce the magnetic fluxes passing through the magnetism sensing element only when the relative turning angle between the magnetic flux generator and the magnetism sensing element is within a predetermined range of turning angles, which predetermined range is less than a full range of relative turning angles,
wherein at least one of said magnetic flux reducer and said magnetic flux generator is rotatable relative to the other of said magnetic flux reducer and said magnetic flux generator,
wherein the magnetic flux reducer includes an external magnetic member made of magnetic material to pass the part of the magnetic fluxes therethrough, and
wherein the magnetic flux generating means includes a magnetic flux passage means, provided separately from the magnetic flux reducing means, for forming a magnetic path different from that of the magnetic flux reducing means.

9. The turning angle detector as in claim 8, wherein the magnet is divided into two generally semi-cylindrical magnet parts and magnetized in a radial direction; and
the magnetism sensing element is disposed between the magnet parts so that the magnetic fluxes pass from one of the magnet parts to the other of the magnet parts through the magnetism sensing element.

10. A turning angle detector comprising:
a magnetic flux generating means including a magnet for generating magnetic fluxes;
a magnetism sensing element responsive to the magnetic fluxes passing therethrough to detect a relative turning angle between the magnetic flux generating means and the magnetism sensing element from the magnetic fluxes passing therethrough; and
a magnetic flux reducing means for passing therethrough only a part of the magnetic fluxes generated by the magnet thereby to reduce the magnetic fluxes passing through the magnetism sensing element only when the relative turning angle between the magnetic flux generating means and the magnetism sensing element is within a predetermined range of turning angles, which predetermined range is less than a full range of relative turning angles,
wherein at least one of said magnetic flux reducing means and said magnetic flux generating means is rotatable relative to the other of said magnetic flux reducing means and said magnetic flux generating means,
wherein the magnetic flux reducing means includes an external magnetic member made of magnetic material to pass the part of the magnetic fluxes therethrough, and
wherein:
the magnet is divided into two generally semi-cylindrical magnet parts and magnetized in a radial direction; and
the magnetism sensing element is disposed between the magnet parts so that the magnetic fluxes pass from one of the magnet parts to the other of the magnet parts through the magnetism sensing element.

11. A turning angle detector comprising:
a magnetic flux generator including a magnet for generating magnetic fluxes;
a magnetism sensing element responsive to the magnetic fluxes passing therethrough to detect a relative turning angle between the magnetic flux generator and the magnetism sensing element from the magnetic fluxes passing therethrough; and
a magnetic flux reducer for passing therethrough only a part of the magnetic fluxes generated by the magnet thereby to reduce the magnetic fluxes passing through the magnetism sensing element only when the relative turning angle between the magnetic flux generator and the magnetism sensing element is within a predetermined range of turning angles, which predetermined range is less than a full range of relative turning angles,
wherein at least one of said magnetic flux reducer and said magnetic flux generator is rotatable relative to the other of said magnetic flux reducer and said magnetic flux generator,
wherein the magnetic flux reducer includes an external magnetic member made of magnetic material to pass the part of the magnetic fluxes therethrough, and
wherein:
the magnet is divided into two generally semi-cylindrical magnet parts and magnetized in a radial direction; and
the magnetism sensing element is disposed between the magnet parts so that the magnetic fluxes pass from one of the magnet parts to the other of the magnet parts through the magnetism sensing element.

* * * * *